(12) United States Patent
Hertlein et al.

(10) Patent No.: US 11,440,803 B2
(45) Date of Patent: Sep. 13, 2022

(54) PROCESS FOR PREPARING POLYCRYSTALLINE SILICON

(71) Applicant: WACKER CHEMIE AG, Munich (DE)

(72) Inventors: Harald Hertlein, Burghausen (DE); Dirk Weckesser, Mehring (DE)

(73) Assignee: WACKER CHEMIE AG, Munich (DE)

( * ) Notice: Subject to any disclaimer, the term of this patent is extended or adjusted under 35 U.S.C. 154(b) by 495 days.

(21) Appl. No.: 16/469,628

(22) PCT Filed: Dec. 14, 2016

(86) PCT No.: PCT/EP2016/080900
§ 371 (c)(1),
(2) Date: Jun. 13, 2019

(87) PCT Pub. No.: WO2018/108258
PCT Pub. Date: Jun. 21, 2018

(65) Prior Publication Data
US 2020/0131043 A1     Apr. 30, 2020

(51) Int. Cl.
*C01B 33/03*     (2006.01)
(52) U.S. Cl.
CPC .................. *C01B 33/03* (2013.01)
(58) Field of Classification Search
CPC ........ C01B 33/03; C01B 33/02; Y02P 20/129
See application file for complete search history.

(56) References Cited

U.S. PATENT DOCUMENTS

| 2,938,772 A | 5/1960 | Enk et al. |
| 6,060,021 A | 5/2000 | Oda |
| 9,988,277 B2 | 6/2018 | Weckesser et al. |
| 10,526,206 B2 * | 1/2020 | Weckesser ............ C01B 33/027 |

(Continued)

FOREIGN PATENT DOCUMENTS

| CM | 102815702 B | 3/2014 |
| CN | 102167326 A | 12/2015 |

(Continued)

OTHER PUBLICATIONS

Chinese Office Action for CN Publication No. 201680091468.3 dated Feb. 28, 2022 and Machine Translation, 10 pages.

*Primary Examiner* — Anthony J Zimmer
*Assistant Examiner* — Logan Edward Laclair
(74) *Attorney, Agent, or Firm* — Brooks Kushman P.C.

(57) ABSTRACT

The invention relates to a method for producing polycrystalline silicon granulate in a fluidized bed reactor. The method comprises a fluidization of silicon seed particles by means of a fluidizing gas in a fluidized bed, which is heated by a heating device, wherein elemental silicon is deposited by pyrolysis on the silicon seed particles by the addition of a reaction gas containing hydrogen and silane and/or halosilane to form the polycrystalline silicon granulate. In a continuous process, waste gas is discharged from the fluidized bed reactor and hydrogen recovered from said waste gas is again supplied to the fluidized bed reactor as a circulating gas. The circulating gas has a nitrogen content of less than 1000 ppmv. The invention further relates to polycrystalline silicon granulate having a nitrogen content of less than 2 ppba.

21 Claims, 1 Drawing Sheet

(56) References Cited

U.S. PATENT DOCUMENTS

| | | |
|---|---|---|
| 2005/0135986 A1 | 6/2005 | Weidhaus et al. |
| 2008/0299291 A1 | 12/2008 | Weidhaus et al. |
| 2011/0206842 A1 | 8/2011 | Revankar et al. |
| 2012/0058040 A1 | 3/2012 | Haeckl et al. |
| 2013/0011558 A1 | 1/2013 | Haeckl et al. |
| 2013/0280533 A1 | 10/2013 | Weckesser et al. |
| 2016/0145109 A1 | 5/2016 | Weckesser |

FOREIGN PATENT DOCUMENTS

| | | | | |
|---|---|---|---|---|
| EP | 1544167 B1 * | 5/2012 | ........... | C01B 33/027 |
| EP | 1544167 B1 | 5/2012 | | |
| EP | 2426085 B1 | 7/2013 | | |
| EP | 2551239 B1 | 3/2014 | | |
| EP | 2976296 A2 | 1/2016 | | |
| EP | 2653446 B1 | 6/2016 | | |
| JP | 11020895 A | 1/1999 | | |
| JP | 2011513182 A | 4/2011 | | |
| JP | 2014505649 A | 3/2014 | | |
| JP | 2016530184 A | 9/2016 | | |
| WO | 09112730 A2 | 9/2009 | | |
| WO | 12087795 A1 | 6/2012 | | |
| WO | 14103939 A1 | 7/2014 | | |

\* cited by examiner

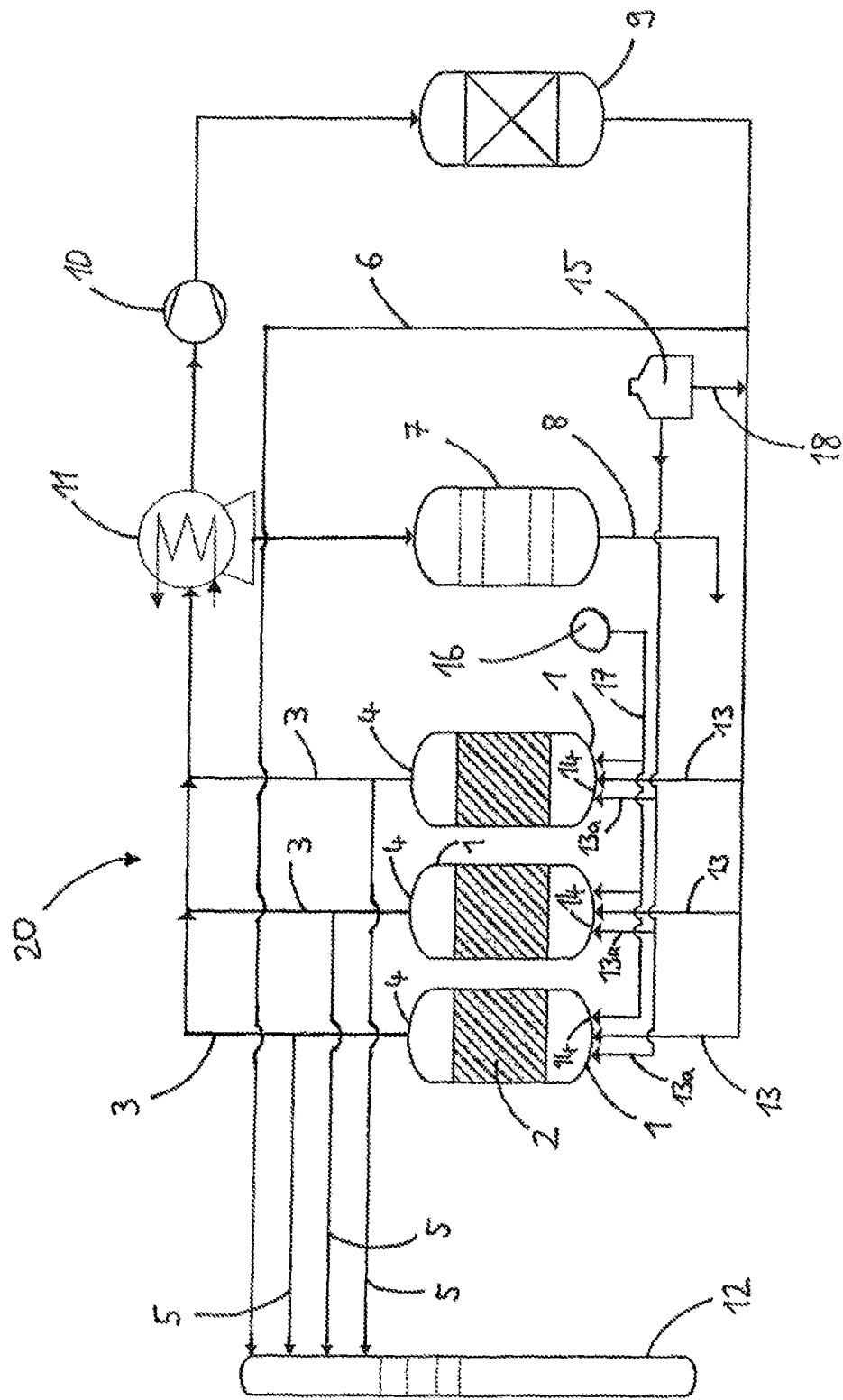

PROCESS FOR PREPARING POLYCRYSTALLINE SILICON

CROSS-REFERENCE TO RELATED APPLICATIONS

This application is a U.S. National Phase Application of PCT/EP2016/080900 filed Dec. 14, 2016 the contents of which are incorporated herein by recurrence in their entireties for all purposes.

FIELD OF THE INVENTION

The invention relates to polycrystalline silicon granulate and a process for the production thereof in a fluidized bed reactor.

BACKGROUND OF THE INVENTION

Granulate of polycrystalline silicon (polysilicon granulate for short) is an alternative to polysilicon produced by the Siemens process. While in the Siemens process polysilicon is produced as a cylindrical silicon rod which before further processing generally requires time-consuming and costly comminution to afford so-called chip poly and may require cleaning, polysilicon granulate has the properties of a dry bulk solid and may be employed directly as raw material, for example for single-crystal production for the electronics industry.

Polysilicon granulate is typically produced in a fluidized bed reactor. This is accomplished by fluidization of silicon particles by means of a gas flow in a fluidized bed, wherein said fluidized bed is heated to high temperatures via a heating apparatus. The addition of a silicon-containing reaction gas brings about a pyrolysis reaction on the hot surface of the silicon particles. This causes elemental silicon to be deposited on the silicon particles and the individual particles continuously grow in diameter. Regular withdrawal of particles that have grown in diameter and addition of relatively small silicon particles as seed particles allows the process to be operated in continuous fashion. Silicon-containing reaction gases that may be employed include silicon-halogen compounds (for example chlorosilanes or bromosilanes, monosilane ($SiH_4$), or mixtures of these gases with hydrogen. Such deposition processes and corresponding apparatuses therefor are known from US 2008/0299291 A1 for example.

The deposition of the elemental silicon forms offgas composed of unconverted reaction gas and gaseous byproducts, in particular halosilanes. The processing of this offgas, in particular the recovery of unused hydrogen, receives increased attention for reasons of cost.

The workup of the offgas formed during silicon deposition is known in principle, for example from EP 2 551 239 A1. Corresponding recirculating processes are moreover discernible from FIGS. 7 and 8 on page 58 in O'Mara, B. Herring, L. Hunt: *Handbook of Semiconductor Silicon Technology*; ISBN 0-8155-1237-6.

The offgas is typically supplied to a multi-stage condensation apparatus, wherein the condensate is fractionated into low-boiling fractions and high-boiling fractions using a distillation column. The low-boiling fractions are sent back to the deposition. The high-boiling fractions generally contain a large proportion of silicon tetrachloride (STC), which may be converted into trichlorosilane (TCS in a conversion apparatus (converter).

The gaseous fractions of the offgas remaining after the condensation are supplied to an adsorption. Here the hydrogen is separated from the other constituents of the gas stream and sent back to the deposition process as recycle gas. In addition the recycle gas may also be admixed with fresh hydrogen (produced or provided externally), for example produced using a steam reformer. In addition or as an alternative, constituents of the reaction gas may be added.

Operation without introduction of nitrogen into the recycle gas system is generally impossible for technical reasons, for example nitrogen-containing dead spaces and unavoidable leakage between the actual reaction space and a jacket-like heating space of the reactor surrounding said reaction space. The fact that for safety reasons (avoidance of a detonating gas reaction) the apparatus requires purging with nitrogen before and after each startup also results in introduction of nitrogen into the recycle gas system. This is because remnants of nitrogen typically remain in so-called dead spaces such as for example stub conduits to measuring instruments and said remnants pass into the recycle gas system upon startup.

Polysilicon is used as a starting material for the production of single-crystal silicon by crucible pulling (Czochralski (CZ process) or by zone melting (float zone (FZ) process). This single-crystal silicon is divided into wafers and after a multiplicity of mechanical, chemical and chemomechanical processing steps used in the semiconductor industry. Polysilicon is further needed for production, by pulling or casting processes, of single-crystal or multicrystalline silicon used in the manufacture of solar cells.

A substantial problem in the production of single-crystal silicon are dislocation faults (one-dimensional, i.e. linear, faults) and stacking faults (two-dimensional, i.e. areal faults) in the crystal construction of the obtained silicon crystals. Both phenomena reduce yield since in principle only silicon crystals which do not exceed a certain number of crystal defects are suitable use in the photovoltaics and electronics industries. Typically the number of stacking defects in silicon wafers should be less than 300 per square centimetre. In principle, single-crystal silicon rods should have less than one dislocation defect per meter of rod length and/or the dislocation-free rod length should be greater than 70%.

A factor which favors the appearance of such crystal defects is for example an excessively high halogen content in the polysilicon used as a starting material. An excessive halogen content generally results in so-called spattering effects in the corresponding pulling or casting processes.

It is additionally known from EP 2 653 446 A2 that the nitrogen content of the polysilicon granulate used as the starting material also has a negative influence on crystal growth. Accordingly, a nitrogen content in a range between 10 and 2000 ppba (parts per billion atoms) is proposed in order not to significantly impair the quality of the descendent products. It had hitherto been assumed that the nitrogen present during deposition of the polysilicon, for example from the recycle gas, is incorporated (dissolved) in the crystal lattice inertly and influences the quality of the obtained polysilicon granulate only in terms of an n-doping.

BRIEF SUMMARY OF THE INVENTION

However, it has surprisingly been found that in polysilicon production the product quality of the polysilicon decreases with increasing deposition temperature, the cause of this correlation hitherto remaining unexplained. At least a SIMS (secondary ion mass spectroscopy) analysis of polysilicon deposited with different nitrogen concentrations in the reaction gas revealed no elevated inert incorporation of nitrogen.

As a result, the deposition temperature is generally not increased above a critical value of about 1080'C in polysilicon production. Temperatures below 1000° C. are customary. However, for reasons of economy it would be desirable to increase the deposition temperature since this would bring about a higher reaction rate and consequently an enhanced reactor output.

The present invention has for its object to provide a polysilicon granulate that upon further processing causes only a small number of dislocation and stacking defects, if any, in the descendent product. The polysilicon granulate should additionally be producible with a particularly economic process.

BRIEF DESCRIPTION OF THE DRAWINGS

FIG. 1 shows a diagram of a plant for performing the process according to the invention.

DETAILED DESCRIPTION OF PREFERRED EMBODIMENTS

This object is achieved by a process having the features of claim 1 and by a polycrystalline silicon granulate having the features of claim 12.

Continuous (recirculating) processes for processing of offgases/recovery of hydrogen in the production of polysilicon and the corresponding recycle gas systems are known per se. Reference may be made here to EP 2 551 239 A1 for example.

It has surprisingly been found that even at deposition temperatures between 1050° C. and 1150° C. the nitrogen, particularly the nitrogen contained in the recycle gas, results in formation of $Si_3N_4$ on the surface of the polysilicon granulate. The rate of formation of $Si_3N_4$ increases exponentially with increasing deposition temperature. It has additionally been recognized that even small amounts of <10 ppba of $Si_3N_4$ in the polysilicon granulate have a negative effect on the quality of descendent products such as single-crystal or multicrystalline silicon.

It is thought that $Si_3N_4$ crystallites inside and on the surface of the polysilicon granulate do not melt in downstream processes such as pulling or casting processes on account of their high melting point, thus causing the dislocation and stacking defects in the descendent product. However, the underlying mechanism has not yet been definitively explained.

In a preferred embodiment the nitrogen content in the recycle gas is less than 500 ppmv (parts per million by volume), preferably less than 100 ppmv, particularly preferably less than 10 ppmv, in particular less than 0.5 ppmv.

The lower nitrogen content in the recycle gas makes it possible particularly advantageously to operate the fluidized bed reactor with higher deposition temperatures than is customary in reactors known from the prior art, in particular above 1100° C. The elevated deposition temperature results in an elevated reaction rate and thus increases reactor output.

The economy of the process is thus improved without impairing product quality.

The deposition of elemental silicon is preferably carried out at a deposition temperature between 1000° C. and 1300° C., preferably between 1080° C. and 1250° C., particularly preferably between 1100° C. and 1200° C. It may be especially preferable to perform the process at a deposition temperature of 1200° C.

During the process the nitrogen content of the recycle gas is preferably determined by means of a measuring instrument. The measuring instrument is in particular a gas chromatograph. To this end a sample may be withdrawn from the reaction space and/or the recycle gas system and supplied to the measuring instrument. The measuring instrument may also be provided directly at the location of sample withdrawal.

Sample withdrawal is preferably carried out at a point on the recycle gas system at which the offgas is discharged from the reactor or at which the recycle gas is sent back to the reactor. A combination of these two options is also conceivable. Such a combination can determine whether an undesired nitrogen introduction tends to occur in the reaction space of the reactor or during the continuous process of offgas processing. It may also be provided, alternatively or in addition, that one or more samples are withdrawn at different points of the recycle gas system, for example upstream or downstream of an adsorption apparatus.

In a preferred embodiment upon overshooting a nitrogen threshold value between 0.01 and 1000 ppmv a shutdown of the fluidized bed reactor is effected. This makes it possible to ensure that deposited polysilicon is not impurified by $Si_3N_4$.

It is preferable when upon overshooting the nitrogen threshold value the supply of the recycle gas into the reactor is interrupted and the process is operated exclusively with external hydrogen until the nitrogen threshold value has been undershot again. External hydrogen is to be understood as meaning in particular hydrogen supplied from an external source. The external source may be for example a reservoir container or an apparatus for steam reforming. It is preferable when high-purity hydrogen is concerned, in particular hydrogen of 3.0 quality or higher, in particular 5.0 quality.

The recycle gas system is preferably completely decoupled from the reaction space of the reactor in the time until the nitrogen threshold value has been undershot. The recycle gas system is preferably purged with external hydrogen until the nitrogen threshold value is undershot. If the recycle gas system does not have a measuring instrument assigned to it the purge duration may also be specified for a particular duration, for example one hour. It is also possible to perform the purging of the recycle gas system with a gas other than nitrogen, for example a noble gas such as argon or helium. Upon undershooting the nitrogen threshold value the addition of the external hydrogen may be partially stopped again and performance of the process using recycle gas may be resumed.

In a further embodiment it is provided that upon overshooting the nitrogen threshold value between 0.01 and 1000 ppmv the temperature of the fluidized bed and/or of a reactor wall is increased until the nitrogen threshold value has been undershot again. The threshold value is preferably measured in the offgas of the fluidized bed reactor.

The temperature of the fluidized bed and/or of the reactor wall may be increased by reducing the amount of reaction gas introduced into the reactor. The reaction gas is generally cooler upon entering the reactor than the fluidized bed temperature. This means that the reaction gas has a certain cooling effect. A reduction of the reaction gas amount can accordingly result in a reduction of this cooling effect. The fluidized bed temperature increases.

Alternatively or in addition a temperature increase may be realized by lowering the fluidized bed (lowering the fluidized bed height) inside the reactor. The reaction space may in principle be heated via the reactor wall. The fluidized bed inside the reaction space is generally cooler than the reactor wall and can accordingly cool said wall. Lowering the fluidized bed height reduces the area of the reactor wall cooled by the fluidized bed and the reactor temperature increases.

It has surprisingly been found that increasing the fluidized bed and/or reactor wall temperature results in reduced nitrogen introduction into the reaction space. The underlying mechanism has not yet been fully explained. It is thought that the temperature increase results in an expansion of the reactor wall, thus increasing the clamping force in the region of seals. The temperature increase may also result in sealing of microcracks in the reactor wall. This sealing of the microcracks could be attributable either to the recited expansion or to a lining of the cracks with deposited silicon.

The recycle gas may be admixed with up to 90%, preferably up to 40%, particularly preferably up to 10%, of external hydrogen. The more hydrogen can be recovered from the offgas the lower the proportion of external hydrogen that must be admixed.

In a preferred embodiment the halosilane that is a constituent of the reaction gas is a chlorosilane, in particular trichlorosilane (TCS).

The specific mass flow of halosilane is preferably in a range between 1600 and 12 000 kg/h$^2$.

The reaction gas is preferably blown into the fluidized bed through one or more nozzles which are in particular arranged at the bottom of the reactor.

The fluidizing gas responsible for fluidizing the silicon particles in the fluidized bed is preferably hydrogen. Also conceivable is the use of an inert gas other than nitrogen such as helium or argon or an inert gas/hydrogen mixture.

It is preferable when before commencement of the process—before startup of the reactor—a pressurization with hydrogen followed by a depressurization is carried out inside the reactor. It is preferable when the maximum pressure during pressurization is in the range between 3.1 and 15 bar, in particular about 6.5 bar, and a minimum pressure during depressurization is in the range between 1.1 and 3 bar, in particular about 1.4 bar. This pressurization and depressurization is particularly preferably performed several times in succession, in particular three times in succession.

The recycle gas system may be included in this pressurization and depressurization. However, it is preferable when the recycle gas system is decoupled from the reaction space before the pressurization and depressurization and optionally undergoes a separate purging program, in particular with hydrogen.

It is preferable when both the pressurization and the depressurization have a duration between 1 and 60 minutes, particularly preferably between 10 and 30 minutes. Triplicate performance of this procedure would accordingly require between 6 and 360 minutes.

Pressurization is preferably carried out with a hydrogen volume flow (standard cubic meters [m$^3$] per hour [h]) per reactor volume ($V_R$ [m$^3$]) between 10 and 7000 m$^3$/hV$_R$, preferably between 300 and 1500 m$^3$/hV$_R$, particularly preferably between 500 and 1000 m$^3$/hV$_R$, in particular of about 520 m$^3$/hV$_R$. For a fluidized bed reactor having a reactor diameter of 1.5 m and a reactor height of 10 m for example this corresponds to a hydrogen volume flow of 9200 m$^3$/h.

A further aspect of the invention relates to polycrystalline silicon granulate having a nitrogen content of less than 2 ppba. Said granulate particularly preferably has a nitrogen content of less than 1 ppba, in particular less than 0.5 ppba.

Preferred methods of measurement for determining the nitrogen content are SIMS (secondary ion mass spectroscopy), FTIR (Fourier transform infrared spectroscopy) and/or analysis by means of an oxygen/nitrogen/hydrogen analyzer (for example ONH836 series from LECO).

No Si$_3$N$_4$ was detectable in the polycrystalline silicon granulate according to the invention by scanning electron microscopy (SEM) and energy dispersive x-ray spectroscopy (EDX).

The polycrystalline silicon granulate according to the invention is preferably free from Si$_3$N$_4$ in particular having regard to the limits of detection of the abovementioned methods of measurement. The polycrystalline silicon according to the invention is thus considered free from Si$_3$N$_4$ for example if no Si$_3$N$_4$ has been detected after performing 200 SIMS analyses.

The surface of the polycrystalline silicon granulate preferably has a surface roughness of 20000≥Ra≥400 nm, preferably 10000≥Ra≥700 nm. Determination of surface roughness may be carried out by optical profilometry.

The chlorine content of the polycrystalline silicon granulate measured by means of neutron activation analysis or x-ray fluorescence analysis is preferably between 0.01 and 30 ppma, particularly preferably between 0.1 and 20 ppma, in particular between 0.2 to 10 ppma.

A further aspect of the invention relates to the use of the polycrystalline silicon granulate for producing single-crystal or multicrystalline silicon.

The single-crystal silicon preferably has a number of stacking defects of less than 300, preferably less than 200, particularly preferably less than 100, in particular less than 10, per square centimetre.

A single-crystal silicon preferably has a number of dislocation defects of less than three, preferably less than one, particularly preferably less than 0.3, in particular less than 0.1, per meter of rod length.

It is preferable when the polysilicon granulate according to the invention is used for producing single crystals by the Czochralski or float zone processes.

Single-crystal silicon produced from polycrystalline silicon according to the invention by crucible pulling (Czochralski (CZ) process) preferably has a dislocation-free length of the single crystals of greater than 70%, preferably greater than 83%, particularly preferably greater than 87%, in particular greater than 90%.

Also preferred is the use of the polycrystalline silicon according to the invention for producing multicrystalline silicon by means of the ingot casting or strand casting processes, multicrystalline ingot solidification in a Bridgman furnace (Bridgman-Stockbarger method), the vertical gradient freeze (VGF) process, the ribbon growth process, the edge-defined film-fed growth (EFB) process and the Direct Wafer™ process (1366 technologies).

Multicrystalline silicon produced from the polycrystalline silicon according to the invention has an elevated material quality. The cause of the improved material quality is not yet understood in detail. What is known is that overshooting the solubility of nitrogen in the silicon causes Si N$_4$ deposits to be formed. These appear in the form of crystalline, acicular and fibrous crystals. They may appear individually or in the form of clusters, often in conjunction with silicon carbide deposits. The crystalline deposits form for example on crucible walls during crucible pulling. It is thought that Si$_3$N$_4$ particles in the polysilicon act as seed particles in the melt in the crucible and upon solidification to afford the multicrystalline silicon ingot are incorporated into the multicrystal as Si$_3$N$_4$ particles. Si$_3$N$_4$ is electrically nonconducting but elevated recombination activities are apparent along Si₃N₄ crystallites in multicrystalline silicon and can impair charge carrier lifetime or cause shorting. This results in a lower material quality of the multicrystalline silicon.

The plant 20 of FIG. 1 comprises three fluidized bed reactors 1, wherein the fluidized bed 2 is in each case indicated by hatched areas. Each fluidized bed reactor 1 has in its reactor head an offgas conduit 3 with which offgas is discharged from the fluidized bed reactor 1. Via gas conduits 13a the reactor bottom 14 of the fluidized bed reactors 1 may be supplied with a fluidizing gas, hydrogen in the present example. The hydrogen is external hydrogen withdrawn from a reservoir 15 and having a purity of 5.0.

Via a gas conduit 17 the reactors 1 are each supplied with the reaction gases, in the present example TCS and hydrogen. The reaction gases are in each case withdrawn from a feed conduit 16 and may in principle be supplied to the reactor 1 together or separately.

The offgas discharged from the fluidized bed reactors 1 via the offgas conduits 3 is supplied to a heat exchanger 11. The heat exchanger 11 which typically comprises a plurality of condensation stages effects a fractionation into high-boiling constituents (for example hydrogen and impurities such as phosphane, methane, nitrogen and arsenic compounds) and low-boiling constituents (for example halosilanes). The high-boiling constituents of the offgas are supplied to a compressor 10 which has the task of increasing the pressure level of these gaseous constituents to an extent such that the obtained hydrogen may later be sent back to the reactors 1.

The high-boiling constituents (the still impure hydrogen) subsequently pass into an adsorber 9 which has the task of removing the impurities such as phosphorus compounds (for example phosphane), methane, hydrogen chloride and/or arsenic compounds. From the adsorber 9 the recovered hydrogen then passes back via the gas conduits 13 into the reactors 1 as recycle gas. Via a conduit 18 the recycle gas may be supplied with external hydrogen from the reservoir 15. The arrangement of offgas conduits 3, heat exchanger 11, compressor 10, adsorber 9 and gas conduits 13 is a recycle gas system, in particular for recovery of hydrogen.

The plant 20 further comprises an apparatus 7 for silane/halosilane processing. The low-boiling constituents of the offgas are supplied to this apparatus 7. The apparatus 7 has the task of separating the silane/halosilane mixtures recovered from the offgas by means of condensation stages. The silane/halosilane mixture leaving the apparatus 7 via a conduit 8 may be either recycled into the reactors 1 or used for other processes as a gas and/or liquid.

Sample withdrawal conduits 5 lead from the offgas conduits 3 to a gas chromatograph 12. A further sample withdrawal conduit 6 which withdraws samples of the recycle gas downstream of the adsorber 9 also leads to the gas chromatograph 12. The gas chromatograph 12 is used for determining the nitrogen content at various points of the recycle gas system.

Examples

As per table 1 various polysilicon granulates were produced by the process according to the invention with a nitrogen content in the recycle gas of less than 1000 ppmv (examples 1, 4-6, 8, 10, 11). An identical reactor was further used to produce polysilicon granulates for comparative purposes, wherein the nitrogen content in the recycle gas was not less than 1000 ppmv (examples 2, 3, 7, 9).

In the case of examples 1, 2, 7 and 9 the deposition temperature was below the temperature critical for the formation of $Si_3N_4$ ($T_k$) of 1080° C. In the case of examples 3 to 6, 8, 10 and 11 the deposition temperature was above $T_k$ (column 2, table 1).

All polysilicon granulates from examples 1 to 11 were produced in a fluidized bed reactor as described in EP 2 976 296 A2.

The nitrogen content in the recycle gas (column 3, table 1) was determined with a gas chromatograph in each case (GC) (process GC: Siemens Maxum edition II; column: RTX-1 fused silica capillary from Restek, column length: 60 m). Sample withdrawal was carried out via a sample withdrawal conduit on the offgas conduit in the reactor head.

The content of silicon nitride ($Si_3N_4$) in the polysilicon granulate was determined using a scanning electron microscope (SEM) with an EDX analyser. To this end a plurality of samples of the obtained silicon granulate were analyzed at 200 points and the maximum value was determined (column 4, table 1). An $Si_3N_4$ content of 0% means that all 200 measurements were below the limit of detection of 1 ppba. A content of 1% means that 2 of 200 measurements were above this limit of detection.

In order to test the quality of the produced polysilicon granulates in respect to the production of descendent products production of single crystals by the Czochralski process was also undertaken.

Determination of dislocation (dislocation-free rod length; column 7, table 1) was observed visually during pulling to afford the single crystal by a change in the pulling edge.

The dislocation-free rod length (pulling yield) is the percentage fraction of the entire rod length which is free from dislocation defects. When measuring the total rod length the starting cone and end cone are disregarded. Thus only the cylindrical rod length is relevant.

The number of stacking defects (column 5, table 1) in the obtained single crystals was determined by counting under an optical microscope (test method ASTM F 416). To count stacking defects test wafers of the silicon rods were oxidized. The oxide layer was subsequently etched off and the defects were made visible with a structural etchant. Counting of the defects was performed under an optical microscope using image recognition software.

The parameters used in single crystal production were identical for all polysilicon granulate starting materials.

TABLE 1

| Example | Deposition temperature [° C.] | $N_2$ in recycle gas [ppmv] | $Si_3N_4$ [%] | Stacking defects [cm$^{-2}$] | Proportion of loss of dislocation-free length through $Si_3N_4$ | Dislocation-free length of single crystals [%] |
|---|---|---|---|---|---|---|
| 1 | 950 ($T_k$ − 130) | 87 | 0 | 1 | 0% | 90% |

TABLE 1-continued

| Example | Deposition temperature [° C.] | $N_2$ in recycle gas [ppmv] | $Si_3N_4$ [%] | Stacking defects [$cm^{-2}$] | Proportion of loss of dislocation-free length through $Si_3N_4$ | Dislocation-free length of single crystals [%] |
|---|---|---|---|---|---|---|
| 2 | 950 ($T_k$ − 130) | 6400 | 0 | 3000 | 0% | 83% |
| 3 | 1081 ($T_k$ + 1) | 1000 | 1.5 | 120 | 24% | 63% |
| 4 | 1081 ($T_k$ + 1) | 650 | 1 | 115 | 21% | 66% |
| 5 | 1112 ($T_k$ + 23) | 0.4 | 0 | 1 | 0% | 89% |
| 6 | 1202 ($T_k$ + 113) | 550 | 2 | 116 | 54% | 55% |
| 7 | 950 ($T_k$ − 130) | 1000 | 0 | 100 | 0% | 87% |
| 8 | 1081 ($T_k$ + 1) | 94 | 0 | 20 | 3% | 90% |
| 9 | 1050 ($T_k$ − 30) | 1000 | 0 | 105 | 1% | 86% |
| 10 | 1081 ($T_k$ + 1) | 450 | 0.5 | 99 | 13% | 82% |
| 11 | 1202 ($T_k$ + 113) | 0.4 | 0 | 0 | 0% | 89% |

In the case of the granulates from examples 1, 2 and 7 in the production of which $T_k$ (1080° C.) was undershot by 130° C. it is apparent that no $Si_3N_4$ was detected irrespective of the nitrogen content in the recycle gas. Even at a $T_k$ undershooting of 30° C. and a nitrogen content of 1000 ppmv (example 9) no $Si_3N_4$ was detected.

However, it is apparent that an elevated nitrogen content in the recycle gas such as in example 2 of 6400 ppmv results in a large number of stacking defects (3000) in the single-crystal silicon produced from the granulate. Since in example 2 the deposition temperature of 950° C. was below the formation temperature of Si $N_4$, the high number of stacking defects is most probably attributable to the inert incorporation of nitrogen into the polysilicon granulate.

It is apparent from examples 3, 4, 8 and 10 how the proportion of nitrogen in the recycle gas affects the $Si_3N_4$ content in the polysilicon granulate. The granulates from the abovementioned examples were all produced at a deposition temperature of 1° C. above $T_k$, i.e. at 1081° C. A nitrogen content of 1000 ppmv (example 3) results in an $Si_3N_4$ content of 1.5%. When using this $Si_3N_4$-containing granulate for the production of silicon single crystals only 66% of the total rod length is dislocation-free. A reduction of the nitrogen content in the recycle gas by more than one half to 450 ppmv as shown in example 10 makes it possible to reduce the $Si_3N_4$ content of the granulate to 0.5% and results in descendent product single-crystal silicon having a dislocation-free length of 82%. In the case of the granulate from example 8 produced at a nitrogen content of only 94 ppmv no $Si_3N_4$ was detectable. Single-crystal silicon having a dislocation-free rod length of 90% was obtainable. Increasing the deposition temperature from 950° C. to 1081° C. causes an exponential threefold increase in the deposition rate and thus significantly increases the economy of the process.

The granulates from examples 5, 6 and 11 were produced at a deposition temperature markedly above $T_k$. The granulate from example 5 ($T_k$+23° C.) was produced at a nitrogen content of only 0.4 ppmv. $Si_3N_4$ was not detectable. A dislocation-free length of 89% was achievable in the descendent product. The granulate from example 6 was produced at a deposition temperature of 1202° C. and a nitrogen content of 550 ppmv. This nitrogen content in combination with the high deposition temperature resulted in an $Si_3N_4$ content of 2%. Accordingly a dislocation free length of only 55% was achievable in the descendent product. The granulate of example 11 was likewise produced at 1202° C. However, the nitrogen content in the recycle gas was only 0.4 ppmv. As in example 5, $Si_3N_4$ was no longer detectable. The dislocation-free length of the descendent product was 89%.

However, the exponential correlation which exists between the deposition temperature and the deposition rate allows for enhancement by up to a factor of 10, thus markedly reducing both production costs and specific capital costs.

The invention claimed is:

1. A method for producing a polycrystalline silicon granulate in a fluidized bed reactor, comprising:
    fluidizing silicon seed particles using a fluidizing gas in a fluidized bed reactor having a reactor wall, which is heated a heating apparatus;
    adding a reaction gas comprising hydrogen, and a silane and/or a halosilane; and
    depositing elemental silicon, by pyrolysis, onto the silicon seed particles to form the polycrystalline silicon granulate; and
    discharging an offgas from a recycle gas system for workup of offgases of the fluidized bed reactor and directing hydrogen recovered from the offgas back to the fluidized bed reactor as a recycle gas, wherein the recycle gas contains nitrogen, and when the nitrogen content exceeds a predetermined threshold value between 0.01 and 1000 ppmv, the reactor is shut down, the reactor continues to operate with external hydrogen and no recycle hydrogen or a lesser amount of recycle hydrogen, or the temperature of the fluidized bed and/or the reactor wall is/are increased until the nitrogen concentration falls below the predetermined threshold value.

2. The method of claim 1, wherein the nitrogen content of the recycle gas is less than 500 ppmv.

3. The method of claim 1, wherein the nitrogen content of the recycle gas is less than 100 ppmv.

4. The method of claim 1, wherein the nitrogen content of the recycle gas is less than 0.5 ppmv.

5. The method of claim 1, wherein the deposition of elemental silicon is carried out at a deposition temperature between 1000° C. and 1300° C.

6. The method of claim 1, wherein the deposition of elemental silicon is carried out at a deposition temperature between 1080° C. and 1250° C.

7. The method of claim 1, wherein the deposition of elemental silicon is carried out at a deposition temperature between 1100° C. and 1200° C.

8. The method of claim 1, wherein the nitrogen content of the recycle gas is measured by a gas chromatograph.

9. The method of claim 1, wherein when the predetermined nitrogen threshold value of nitrogen is exceeded the fluidized bed reactor is shut down.

10. The method of claim 1, wherein when the predetermined threshold value of nitrogen is exceeded, flow of recycle gas is interrupted and the method is operated with external hydrogen until the nitrogen concentration reaches or is below threshold value of nitrogen.

11. The method of claim 1, wherein upon exceeding the predetermined threshold value of nitrogen, the temperature of the fluidized bed and/or of the reactor wall is increased until the nitrogen concentration reaches or is below the predetermined threshold value of nitrogen.

12. The method of claim 1, wherein the recycle gas is admixed with less than 90% of external hydrogen.

13. The method of claim 1, wherein the recycle gas is admixed with less than 40% of external hydrogen.

14. The method of claim 1, wherein the recycle gas is admixed with less than 10% of external hydrogen.

15. The method of claim 1, wherein the halosilane is a chlorosilane.

16. The method of claim 1, wherein the halosilane is a trichlorosilane.

17. The method of claim 1, wherein before commencement of the method a pressurization with hydrogen followed by a depressurization is carried out inside the fluidized bed reactor, wherein a maximum pressure during pressurization is in the range between 3.1 and 15 bar, and a minimum pressure during depressurization is in the range between 1.1 and 3 bar.

18. The method of claim 17, wherein the pressurization and the depressurization each have a duration between 1 and 60 min.

19. The method of claim 18, wherein the pressurization is carried out with a hydrogen volume flow per reactor volume VR between 10 and 7000 m$^3$/hVR.

20. A polycrystalline silicon granulate comprising an $Si_3N_4$ content of less than 1 ppba, prepared by the method of claim 1.

21. The polycrystalline silicon granulate of claim 19, comprising a surface roughness Ra≥400 nm.

* * * * *